United States Patent
McMahon et al.

(10) Patent No.: US 9,538,106 B2
(45) Date of Patent: Jan. 3, 2017

(54) IMAGE SENSOR HAVING A UNIFORM DIGITAL POWER SIGNATURE

(71) Applicant: Apple Inc., Cupertino, CA (US)

(72) Inventors: Andrew Kenneth John McMahon, Cupertino, CA (US); Chiajen Lee, Cupertino, CA (US); Michael R. Malone, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 14/276,728

(22) Filed: May 13, 2014

(65) Prior Publication Data

US 2015/0312479 A1    Oct. 29, 2015

Related U.S. Application Data

(60) Provisional application No. 61/984,574, filed on Apr. 25, 2014.

(51) Int. Cl.
*H04N 5/357* (2011.01)
*H04N 5/376* (2011.01)
*H04N 5/378* (2011.01)

(52) U.S. Cl.
CPC ............ *H04N 5/3577* (2013.01); *H04N 5/378* (2013.01); *H04N 5/3765* (2013.01)

(58) Field of Classification Search
CPC .. H04N 5/23241; H04N 5/369; H04N 5/3577; H04N 1/00994; H03M 1/12
USPC .................. 348/372, 241, 294, 312; 341/155
See application file for complete search history.

(56) References Cited

U.S. PATENT DOCUMENTS

| | | |
|---|---|---|
| 4,686,648 A | 8/1987 | Fossum |
| 5,105,264 A | 4/1992 | Erhardt et al. |
| 5,329,313 A | 7/1994 | Keith |
| 5,396,893 A | 3/1995 | Oberg et al. |
| 5,471,515 A | 11/1995 | Fossum et al. |
| 5,541,402 A | 7/1996 | Ackland |
| 5,550,677 A | 8/1996 | Schofield et al. |

(Continued)

FOREIGN PATENT DOCUMENTS

| | | |
|---|---|---|
| CN | 1842138 | 10/2006 |
| CN | 101189885 | 5/2008 |

(Continued)

OTHER PUBLICATIONS

U.S. Appl. No. 14/462,032, filed Aug. 18, 2014, Jiang et al.

(Continued)

*Primary Examiner* — Nhan T Tran
(74) *Attorney, Agent, or Firm* — Brownstein Hyatt Farber Schreck, LLP

(57) ABSTRACT

An image sensor and a method of operating an image sensor to achieve a substantially uniform power signature. An array of pixels may be scanned using analog sensing circuitry to obtain an analog sensor output. The scanning is performed over a first time interval. The analog sensor output is converted to a digital data output using digital logic circuitry. The converting occurs over a second time interval that is subsequent to the first time interval and may be substantially the same duration as the first time interval. While the array of pixels are being scanned, the digital logic circuitry is operated over the first time interval and substantially coincides with the scanning of the array of pixels.

20 Claims, 7 Drawing Sheets

(56) References Cited

U.S. PATENT DOCUMENTS

| | | |
|---|---|---|
| 5,781,312 A * | 7/1998 | Noda ............... H04N 5/3575 348/272 |
| 5,841,126 A | 11/1998 | Fossum et al. |
| 5,880,459 A | 3/1999 | Pryor et al. |
| 5,949,483 A | 9/1999 | Fossum et al. |
| 6,008,486 A | 12/1999 | Stam et al. |
| 6,040,568 A | 3/2000 | Caulfield et al. |
| 6,233,013 B1 | 5/2001 | Hosier et al. |
| 6,348,929 B1 | 2/2002 | Acharya et al. |
| 6,448,550 B1 | 9/2002 | Nishimura |
| 6,541,751 B1 * | 4/2003 | Bidermann ............ H04N 5/357 348/241 |
| 6,713,796 B1 | 3/2004 | Fox |
| 6,714,239 B2 | 3/2004 | Guidash |
| 6,798,453 B1 | 9/2004 | Kaifu |
| 6,816,676 B2 | 11/2004 | Bianchi et al. |
| 6,905,470 B2 | 6/2005 | Lee et al. |
| 6,982,759 B2 | 1/2006 | Goto |
| 7,091,466 B2 | 8/2006 | Bock |
| 7,133,073 B1 | 11/2006 | Neter |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,332,786 B2 | 2/2008 | Altice |
| 7,390,687 B2 | 6/2008 | Boettiger |
| 7,437,013 B2 | 10/2008 | Anderson |
| 7,443,421 B2 | 10/2008 | Stavely et al. |
| 7,502,054 B2 | 3/2009 | Kalapathy |
| 7,525,168 B2 | 4/2009 | Hsieh |
| 7,554,067 B2 | 6/2009 | Zarnowski et al. |
| 7,555,158 B2 | 6/2009 | Lee |
| 7,626,626 B2 | 12/2009 | Panicacci |
| 7,671,435 B2 | 3/2010 | Ahn |
| 7,728,351 B2 | 6/2010 | Shim |
| 7,733,402 B2 | 6/2010 | Egawa et al. |
| 7,742,090 B2 | 6/2010 | Street |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 8,026,966 B2 | 9/2011 | Altice |
| 8,032,206 B1 | 10/2011 | Farazi et al. |
| 8,089,524 B2 | 1/2012 | Urisaka |
| 8,094,232 B2 | 1/2012 | Kusaka |
| 8,116,540 B2 * | 2/2012 | Dean ................ G06K 9/0002 382/124 |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,184,188 B2 | 5/2012 | Yaghmai |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,340,407 B2 | 12/2012 | Kalman |
| 8,350,940 B2 | 1/2013 | Smith et al. |
| 8,400,546 B2 | 3/2013 | Itano et al. |
| 8,456,559 B2 | 6/2013 | Yamashita |
| 8,508,637 B2 | 8/2013 | Han et al. |
| 8,514,308 B2 | 8/2013 | Itonaga et al. |
| 8,520,913 B2 * | 8/2013 | Dean ................ G06K 9/0002 382/124 |
| 8,547,388 B2 | 10/2013 | Cheng |
| 8,575,531 B2 | 11/2013 | Hynecek et al. |
| 8,581,992 B2 | 11/2013 | Hamada |
| 8,619,163 B2 | 12/2013 | Ogura |
| 8,629,484 B2 | 1/2014 | Ohri et al. |
| 8,634,002 B2 | 1/2014 | Kita |
| 8,648,947 B2 | 2/2014 | Sato et al. |
| 8,723,975 B2 | 5/2014 | Solhusvik |
| 8,754,983 B2 | 6/2014 | Sutton |
| 8,755,854 B2 | 6/2014 | Addison et al. |
| 8,759,736 B2 | 6/2014 | Yoo |
| 8,803,990 B2 | 8/2014 | Smith |
| 8,817,154 B2 | 8/2014 | Manabe et al. |
| 8,902,330 B2 | 12/2014 | Theuwissen |
| 8,908,073 B2 | 12/2014 | Minagawa |
| 8,934,030 B2 | 1/2015 | Kim et al. |
| 8,946,610 B2 | 2/2015 | Iwabuchi et al. |
| 8,982,237 B2 | 3/2015 | Chen |
| 9,054,009 B2 | 6/2015 | Oike et al. |
| 9,066,017 B2 | 6/2015 | Geiss |
| 9,066,660 B2 | 6/2015 | Watson et al. |
| 9,088,727 B2 | 7/2015 | Trumbo |
| 9,099,604 B2 | 8/2015 | Roy |
| 9,100,597 B2 | 8/2015 | Hu |
| 9,131,171 B2 | 9/2015 | Aoki et al. |
| 9,232,150 B2 | 1/2016 | Kleekajai et al. |
| 2003/0036685 A1 | 2/2003 | Goodman et al. |
| 2004/0207836 A1 | 10/2004 | Chhibber et al. |
| 2005/0026332 A1 | 2/2005 | Fratti et al. |
| 2006/0274161 A1 | 12/2006 | Ing et al. |
| 2007/0263099 A1 | 11/2007 | Motta et al. |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0146234 A1 | 6/2009 | Luo et al. |
| 2009/0201400 A1 | 8/2009 | Zhang et al. |
| 2010/0134631 A1 | 6/2010 | Voth |
| 2011/0080500 A1 | 4/2011 | Wang et al. |
| 2011/0156197 A1 | 6/2011 | Tivarus et al. |
| 2011/0205415 A1 | 8/2011 | Makino et al. |
| 2011/0245690 A1 | 10/2011 | Watson et al. |
| 2012/0092541 A1 | 4/2012 | Tuulos et al. |
| 2012/0098964 A1 | 4/2012 | Oggier et al. |
| 2012/0147207 A1 | 6/2012 | Itonaga |
| 2012/0153125 A1 | 6/2012 | Oike et al. |
| 2013/0101006 A1 * | 4/2013 | Mombers ............... G06F 1/10 375/226 |
| 2013/0147981 A1 | 6/2013 | Wu |
| 2013/0155271 A1 | 6/2013 | Ishii |
| 2013/0225584 A1 | 8/2013 | Aoki et al. |
| 2014/0004644 A1 | 1/2014 | Roy |
| 2014/0049683 A1 | 2/2014 | Guenter |
| 2014/0071321 A1 | 3/2014 | Seyama |
| 2014/0240550 A1 | 8/2014 | Taniguchi et al. |
| 2014/0246568 A1 | 9/2014 | Wan |
| 2014/0247378 A1 | 9/2014 | Sharma et al. |
| 2014/0252201 A1 | 9/2014 | Li et al. |
| 2014/0253754 A1 | 9/2014 | Papiashvili |
| 2014/0253768 A1 | 9/2014 | Li |
| 2014/0263951 A1 | 9/2014 | Fan et al. |
| 2014/0267855 A1 | 9/2014 | Fan |
| 2014/0347533 A1 | 11/2014 | Toyoda |
| 2014/0354861 A1 | 12/2014 | Pang |
| 2015/0163392 A1 | 6/2015 | Malone et al. |
| 2015/0163422 A1 | 6/2015 | Fan et al. |
| 2015/0237314 A1 | 8/2015 | Hasegawa |
| 2015/0264241 A1 | 9/2015 | Kleekajai et al. |
| 2015/0264278 A1 | 9/2015 | Kleekajai et al. |
| 2015/0350575 A1 | 12/2015 | Agranov et al. |
| 2016/0050379 A1 | 2/2016 | Jiang et al. |

FOREIGN PATENT DOCUMENTS

| | | |
|---|---|---|
| CN | 101233763 | 7/2008 |
| CN | 101472059 | 7/2009 |
| CN | 101567977 | 10/2009 |
| CN | 101622859 | 1/2010 |
| CN | 101803925 | 8/2010 |

(56) References Cited

FOREIGN PATENT DOCUMENTS

| | | |
|---|---|---|
| CN | 102036020 | 4/2011 |
| CN | 102821255 | 12/2012 |
| CN | 103329513 | 9/2013 |
| CN | 103546702 | 1/2014 |
| EP | 2023611 | 2/2009 |
| EP | 2107610 | 10/2009 |
| EP | 2230690 | 9/2010 |
| JP | 201149697 | 3/2011 |
| JP | 2012019516 | 1/2012 |
| JP | 2012513160 | 6/2012 |
| KR | 20030034424 | 5/2003 |
| KR | 20030061157 | 7/2003 |
| KR | 2008/0069851 | 7/2008 |
| KR | 20100008239 | 1/2010 |
| KR | 20100065084 | 6/2010 |
| KR | 20130074459 | 7/2013 |
| TW | 201301881 | 1/2013 |
| WO | WO 2010/120945 | 10/2010 |
| WO | WO 2012/053363 | 4/2012 |
| WO | WO 2012/088338 | 6/2012 |
| WO | WO 2012/122572 | 9/2012 |
| WO | WO 2013/008425 | 1/2013 |
| WO | WO 2013/179018 | 12/2013 |
| WO | WO 2013/179020 | 12/2013 |

OTHER PUBLICATIONS

Aoki et al., "Rolling-Shutter Distortion-Free 3D Stacked Image Sensor with—160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.
U.S. Appl. No. 13/782,532, filed Mar. 1, 2013, Sharma et al.
U.S. Appl. No. 13/783,536, filed Mar. 4, 2013, Wan.
U.S. Appl. No. 13/785,070, filed Mar. 5, 2013, Li.
U.S. Appl. No. 13/787,094, filed Mar. 6, 2013, Li et al.
U.S. Appl. No. 13/797,851, filed Mar. 12, 2013, Li.
U.S. Appl. No. 13/830,748, filed Mar. 14, 2013, Fan.
U.S. Appl. No. 14/098,504, filed Dec. 5, 2013, Fan et al.
U.S. Appl. No. 14/207,150, filed Mar. 12, 2014, Kleekajai et al.
U.S. Appl. No. 14/207,176, filed Mar. 12, 2014, Kleekajai et al.
U.S. Appl. No. 14/292,599, filed May 30, 2014, Agranov et al.
Schwarzer, et al., On the determination of film stress from substrate bending: Stoney'S formula and its limits, Jan. 2006, 19 pages.
U.S. Appl. No. 14/481,806, filed Sep. 9, 2014, Kleekajai et al.
U.S. Appl. No. 14/481,820, filed Sep. 9, 2014, Lin et al.
U.S. Appl. No. 14/501,429, filed Sep. 30, 2014, Malone et al.
U.S. Appl. No. 14/503,322, filed Sep. 30, 2014, Molgaard.
U.S. Appl. No. 14/569,346, filed Dec. 12, 2014, Kestelli et al.
U.S. Appl. No. 14/611,917, filed Feb. 2, 2015, Lee et al.
Elgendi, "On the Analysis of Fingertip Photoplethysmogram Signals," *Current Cardiology Reviews*, 2012, vol. 8, pp. 14-25.
Fu, et al., "Heart Rate Extraction from Photoplethysmogram Waveform Using Wavelet Multui-resolution Analysis," *Journal of Medical and Biological Engineering*, 2008, vol. 28, No. 4, pp. 229-232.
Han, et al., "Artifacts in wearable photoplethysmographs during daily life motions and their reduction with least mean square based active noise cancellation method," *Computers in Biology and Medicine*, 2012, vol. 42, pp. 387-393.
Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.
Santos, et al., "Accelerometer-assisted PPG Measurement During Physical Exercise Using the LAVIMO Sensor System," *Acta Polytechnica*, 2012, vol. 52, No. 5, pp. 80-85.
Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.
Yan, et al., "Reduction of motion artifact in pulse oximetry by smoothed pseudo Wigner-Ville distribution," *Journal of Neuro Engineering and Rehabilitation*, 2005, vol. 2, No. 3, pp. 1-9.
Yousefi, et al., "Adaptive Cancellation of Motion Artifact in Wearable Biosensors," 34th Annual International Conference of the IEEE EMBS, San Diego, California, Aug./Sep. 2012, pp. 2004-2008.
Feng, et al., "On the Stoney Formula for a Thin Film/Substrate System with Nonuniform Substrate Thickness," Journal of Applied Mechanics, Transactions of the ASME, vol. 74, Nov. 2007, pp. 1276-1281.
Schwarzer, et al., On the determination of film stress from substrate bending: Stoney'S formula and its limits, Jan. 2006, 17 pages.

* cited by examiner

IMAGE SENSOR HAVING A UNIFORM DIGITAL POWER SIGNATURE

CROSS-REFERENCE TO RELATED APPLICATION

This application claims the benefit under 35 U.S.C. §119 (e) of U.S. Provisional Patent Application No. 61/984,574, filed Apr. 25, 2014, which is incorporated by reference as if fully disclosed herein.

TECHNICAL FIELD

The following disclosure generally relates to image sensors, and more specifically to an image sensor having a uniform power signature.

BACKGROUND

A traditional digital camera includes an image sensor and processing circuitry for converting an optical image into digital data that can be stored or transmitted for viewing. Some image sensors perform analog optical sensing and digital logic processing on the same integrated circuit (IC). In some cases, the physical packaging of the IC is minimized to provide an image sensor that can placed in compact digital camera devices.

However, due to the physical and electrical integration the digital logic with the analog optical sensing, operations performed within the digital logic may generate interference or electrical noise that affects the analog operations. In some cases, the interference or noise produces a visible artifact or in a digital image that may be distracting or undesirable.

One traditional solution to reduce the effects of interference is to physically isolate the analog sensors from the digital logic processing. However, the increasingly compact physical packaging constraints may limit the amount of physical separation that can be accommodated. That is, to achieve sufficient physical isolation between the analog and digital portions of an image sensor, the size of the image sensor may be too large to fit into the limited space available in some types of digital cameras. This is particularly true for digital cameras that are integrated into a mobile telephone or other portable electronic device. Additionally, increasing demands in the processing capabilities of the on-board digital logic processing may further exacerbate interference problems between the circuitry.

Thus, there is a need for a system and technique for reducing the effect of digital logic interference on the quality of a digital image. The techniques disclosed herein can be used to produce a digital image having reduced or minimized visual artifacts without significantly increasing the size of the sensor or the drawbacks of some traditional noise reduction techniques.

SUMMARY

One example embodiment includes a method of operating an image sensor to achieve a substantially uniform power signature. An array of pixels may be scanned using analog sensing circuitry to obtain an analog sensor output. The scanning is performed over a first time interval. The analog sensor output is converted to a digital data output using digital logic circuitry. The converting occurs over a second time interval that is subsequent to the first time interval and may be substantially the same duration as the first time interval. While the array of pixels are being scanned, the digital logic circuitry is operated over the first time interval and substantially coincides with the scanning of the array of pixels.

In some example embodiments, operating the digital logic circuit includes setting a processing rate of the digital logic circuitry to cause the operating of the digital logic circuitry to occur throughout the first time interval. The operation may also include performing two or more individual digital logic operations at the set processing rate. In some cases, the two or more individual digital logic operations are performed on data obtained from a previous pixel scanning operation. In some cases, the two or more individual digital logic operations are separated by a delay period that is less than a duration of either of the two or more individual digital logic operations. The delay period may be less than, for example, 10% of the duration of either of the two or more individual digital logic operations. In some cases, the delay period may be less than 5% of the duration of the individual digital logic operations.

In some example embodiments, the operations may be metered out so that the digital processing substantially coincides with the analog sensing operations. For example, in some cases, operating the digital logic circuitry includes performing one or more valid digital logic operations on data obtained from a previous scan using the analog sensing circuitry. The operations may also include performing one or more spacer digital logic operations on simulated data that was not obtained using the analog sensing circuitry. In some cases, the one or more valid digital logic operations in combination with the one or more spacer digital logic operations cause the operating of the digital logic circuitry to occur throughout the first time interval.

DETAILED DESCRIPTION

Figure 1A:
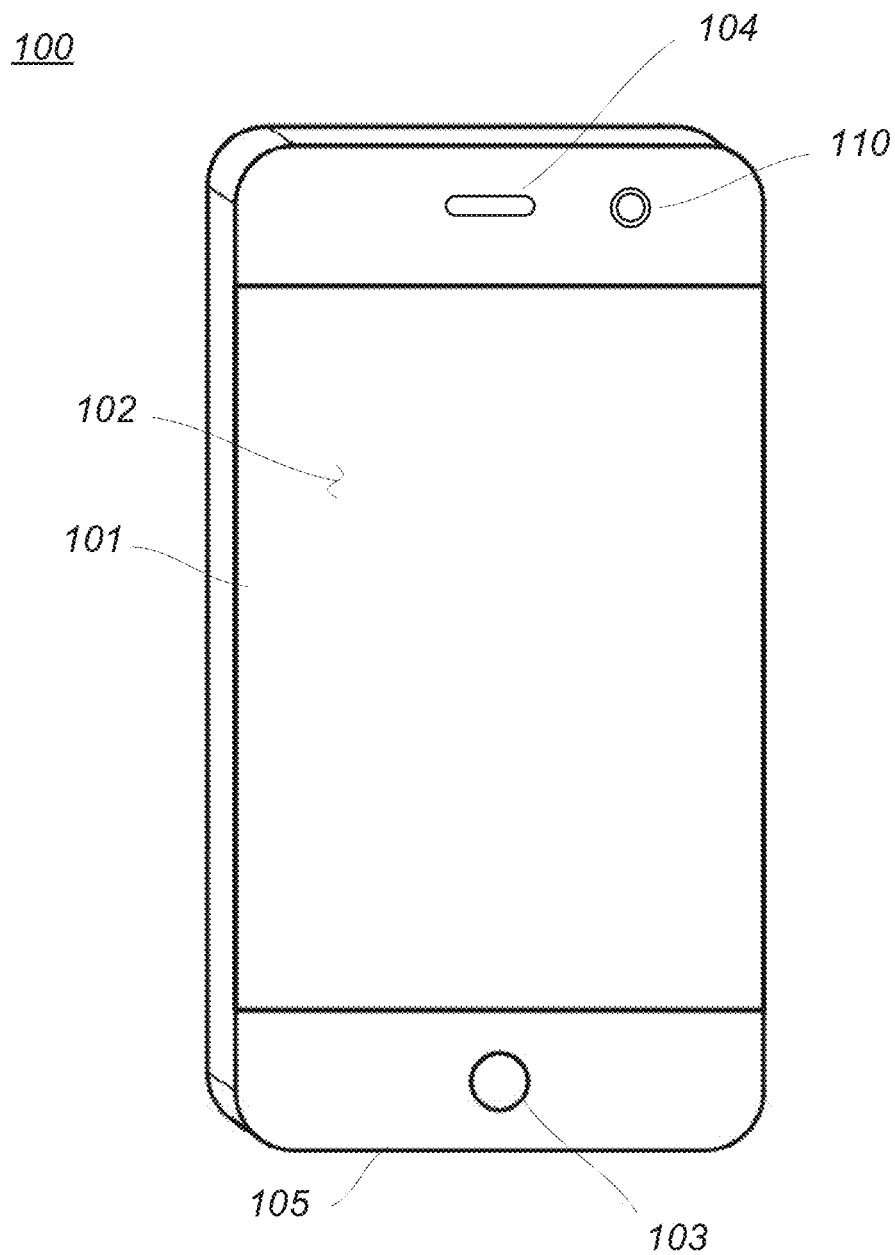
FIGS. 1A-B depict a device having at least one image sensor.

In general, a digital camera may include an image sensor for converting an optical image into digital data that is used to produce a digital image. The image sensor may be implemented on one or more integrated circuits (ICs) that are configured to convert light into electrical signals and convert the electrical signals into digital data. Generally, the one or more ICs form multiple electrical subsystems that are physically and electrically integrated together. In one example, the one or more integrated circuits includes, among other elements, analog sensor circuitry used to detect and measure the light of the optical image, and digital logic circuitry coupled to the analog sensor circuitry and used to convert the analog signals into digital data.

As previously mentioned, due to size constraints in a typical implementation, one or more of the circuit subsystems may cause interference that results in visual artifacts or defects in a digital image. In particular, electrical power consumption in the digital logic circuitry may create electrical noise that affects the output of the analog sensor circuitry. The noise or emissions caused by the operation of the digital logic circuitry and apparent to other subsystems may be referred to as a power signature. As mentioned previously, one solution to reduce the effect of the digital logic operations on the analog sensor circuitry is to physically isolate the two subsystems. However, this solution may not be practical for some compact image sensors that may be configured to minimize the physical footprint of the digital camera.

Another solution is to minimize the amount of time that the digital logic circuitry is operated to reduce the impact of any interference that exists. However, as previously mentioned, the processing requirements on image sensors tend to increase rather than decrease as digital camera technology evolves. Furthermore, the abrupt change between operating and non-operating conditions may result in artifacts that are even more pronounced and may be difficult to compensate for using post-processing techniques.

Another solution, is to actually increase the overall amount of interference produced by the digital logic circuitry to produce a more uniform effect on the analog sensing circuitry. For example, the operation of the digital logic circuitry may be artificially extended so that the operation of the digital logic circuitry substantially overlaps with interference-sensitive operations performed in the analog sensing circuitry. This may result in a substantially uniform interference, which may alter the digital image, but in a way that is not as visually distinguishable. In some cases, the power signature of the digital logic may affect the entire image in equal amounts, which may not apparent or noticeable to the human eye. Additionally, an interference effect that is more uniform and predictable, may be easier to compensate for using post-processing techniques.

Some of the examples described herein are directed to an image sensor and processes for operating an image sensor in a uniform power mode. In some cases, the image sensor may have a uniform power signature that reduces or minimizes the visual artifacts in a digital image produced using the image sensor. Additionally, an image sensor having a uniform power signature may be particularly well suited for devices having limited space for image sensor hardware. For example, as described in more detail below with respect to FIGS. 1A-B, an image sensor having a uniform power signature may be particularly well suited for use in a digital camera of a portable electronic device.

1. Example Portable Electronic Device

Figure 1B:
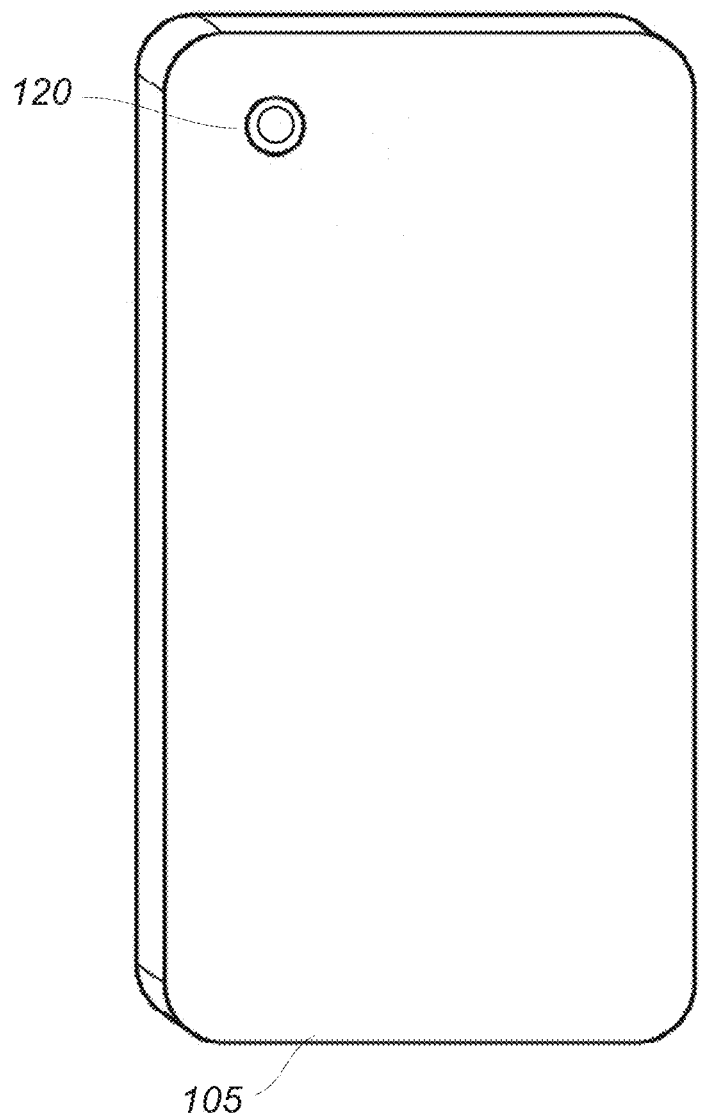

As previously mentioned, an image sensor having a uniform power signature may be integrated into a compact digital camera that is particularly well suited for use in a portable electronic device. In accordance with various embodiments, FIGS. 1A-B depict a device having at least one digital camera having an image sensor that may have a uniform power signature when operated. In particular, FIG. 1A depicts the front side of a device 100 having a front camera 110, and FIG. 1B depicts the rear side of device 100 having a rear camera 120. In the present example, either the front camera 110, the rear camera 120, or both may include an image sensor in accordance with the embodiments described herein. An example image sensor 200 is described below with respect to FIG. 2.

As shown in FIG. 1A, the device 100 includes a display 101 for presenting or displaying a user interface to the user. A digital image produced by one of the digital cameras 110 or 120 may be displayed to a user using display 101. A digital image produced by one of the digital cameras 110 or 120 may also be displayed on another display device that is separate to the device 100 depicted in FIGS. 1A-B. Additionally, the digital image may be stored in a non-transitory computer-readable medium, including for example, RAM, ROM, EPROM, magnetic media, solid state media, or other type of computer data storage. As shown in FIG. 1A, the device 100 also includes a touch sensor 102 and a control button 103 for receiving touch input from the user. In this example, the device 100 is a mobile telephone having a speaker 104 and a microphone 105 for producing and receiving voice audio from the user.

In this example, the device 100 includes a touch sensor 102 that is a transparent sensor configured to detect and track multiple touch input from the user. The touch sensor 102 may be used to input commands to the device 100, including, for example, a camera shutter command, a video record command, or other control related to the digital cameras 110, 120. The touch sensor may also be used to provide user controls for operation of the mobile phone or other functionality provided on the device 100. The touch sensor 102 may be formed from a grid of transparent conductive traces configured to detect a touch using a capacitive sensing technique. Alternatively, the touch sensor 102 can be formed from a non-transparent sensor and implement non-capacitive sensing techniques.

The device 100 may also accept user input via the control button 102. The control button 102 may provide, for example, a camera shutter command, a video record command, or other control related to the digital cameras 110, 120. The control button 102 may be used as a user control to toggle the display 101 on or off. The operation of the control button 102 can be used to control various other functions on the device 100.

As shown in FIG. 1A, the device includes a front camera 110 for capturing an image or video of objects located proximate to the front side of the device 100. The front camera 110 includes a digital image sensor and one or more optical elements for directing light onto the digital image sensor. As shown in FIG. 1B, the device also includes a rear camera 120 for capturing an image or video of objects located proximate to the rear side of the device 100. The rear camera 120 also includes a digital image sensor and one or more optical elements for directing light onto the digital image sensor.

The image sensor used for either the front 110 or rear 120 digital cameras includes a sensor array or matrix integrated into one or more surfaces of an IC component. For example, the image sensor may include a charge-coupled device (CCD) sensor array, complementary metal-oxide-semiconductor (CMOS) image sensor array, or other type of active-pixel sensor. A typical sensor array may include a two-dimensional array of sensor cells, where each cell may include a photodetector, such as a photodiode, and one or more transistors to activate each pixel. These elements may form part of the analog sense circuitry used to convert light into electrical energy. Also, as described in more detail with respect to FIG. 2, below, the image sensor may also include digital logic circuitry for converting electrical signals produced by the analog sensor circuitry into digital data. The quality of the image produced using the image sensor depends, in part, on the electrical interaction between these two subsystems.

Figure 2:
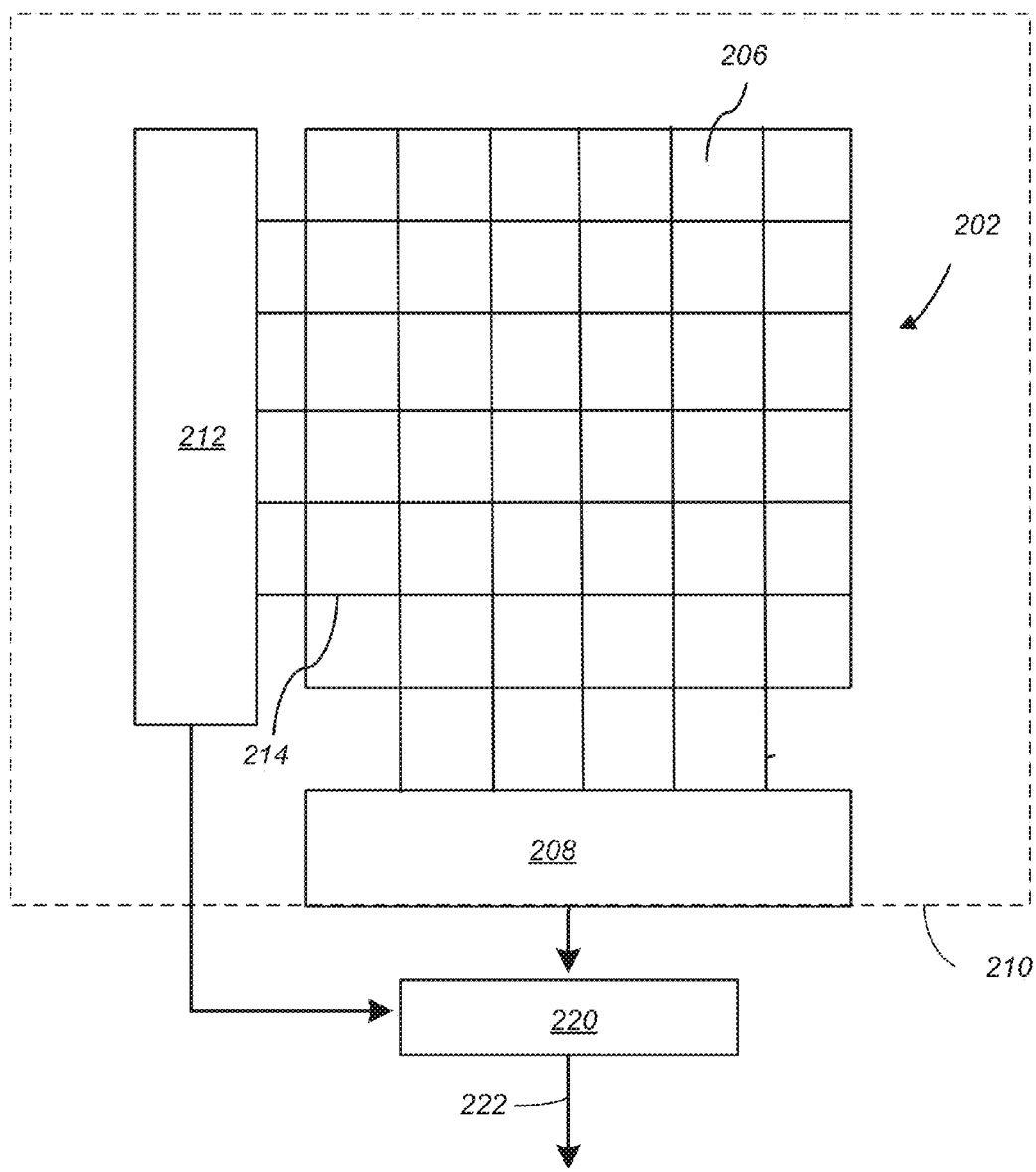
FIG. 2 depicts a schematic diagram of an example image sensor.

FIG. 2 depicts an example schematic of an image sensor having both analog and digital logic circuitry. In this example, the image sensor 200 is a CMOS image sensor that is configured to detect and measure light associated with an optical image projected onto the imaging area 204 of the sensor 200 and configured to produce a digital image representing the optical image. In some cases, the digital image is output from the image sensor 200 via the output interface 222. The output interface may include one of a variety of digital output interfaces, including, for example, a parallel interface, a Mobile Industry Processor Interface (MIPI), or the like. The digital image can be transmitted to another portion of the device or stored for later access. While the following description is provided with respect to a 2-dimensional CMOS image sensor, in alternative embodiments, a 1-dimensional scanner, a CCD image sensor or other type active pixel sensor could also be used.

As shown in FIG. 2, the image sensor 200 includes an imaging area 204 used to capture the light of the optical image. The optical image may be formed or projected using one or more focusing lenses and other optical elements integrated into the optical system of the digital camera. The imaging area 202 is formed from an array of photodetector pixels 206. Each pixel 206 is configured to convert light (photon) energy into an electric signal, such as an electric charge, that corresponds to the amount of light incident over the area of the pixel 206. In an example implementation, the electric charge for each pixel 206 is accumulated over an integration time before it is read out and the is pixel reset.

The electrical signals produced by the pixels 206 are collected using one or more row scanners 212 or one or more column scanners 208. For purposes of this example, the photodetector pixels 206, the row 212 scanner, and the column scanner 208 together form part of the analog sensing circuitry 210. In other examples, there may be additional electronic components that also form part of the analog sensing circuitry. For example, the sensor 200 may include other components for conditioning the power or processing signals produced by the image sensor 200.

As shown in FIG. 2, the image sensor 200 also includes digital logic circuitry 220, which is electrically connected to the output of the row 212 and column 208 scanners of the analog sensing circuitry 210. The digital logic circuitry 220 includes, among other elements, an analog to digital converter, one or more digital logic processors, and other digital logic components. In the current example, the digital logic circuitry 220 is configured to convert the analog signals produced by the analog sensing circuitry 210 into digital data, such as a digital image, that may be transmitted to other components via the output interface 222. In addition to the elements depicted in FIG. 2, the sensor 200 may also include additional circuitry, including addressing circuitry, clock circuitry, and power supply and power conditioning circuitry.

In a typical implementation, the analog sensing circuitry 210 operates on a regular (row or column) scan cycle to collect electrical signals accumulated by the photodetector pixels 206. With regard to a CMOS-type image sensor, the analog sensing circuitry 210 may operate on a row-scan cycle where each row 214 of pixels 206 is scanned sequentially. During each row scan cycle, the charge that has been accumulated on each pixel 206 in the row 214 (signal value) is read out and the pixel is reset to begin charge accumulation for the next cycle. In some cases, the residual signal of the pixel in the reset state (reset value) is also read out during the row scan cycle.

At the completion of a row scan cycle, the electric signals that are collected by the row scanner 212 are passed to the digital logic circuitry 220. During a subsequent row scan, the digital logic circuitry 220 may processes the electric signals and convert the signals to digital data. In some cases, operations performed by the digital logic circuitry 220 produce electrical noise or interference due to minor fluctuations in power consumption. In particular, digital data transmission and digital data processing results in power consumption as bit values switch from low to high and some power dissipation as bit values switch from high to low. The electrical noise generated in the digital logic circuitry may be transmitted to other portions of the IC through the power lines, through the silicon substrate, or in electromagnetic fields around the sensor. Collectively, the electrical noise generated by the digital logic circuitry and apparent to other subsystems may be referred to as a power signature.

As previously mentioned, the power signature of the digital logic circuitry 220 may affect the sensor operations of the analog sensing circuitry 212. In particular, interference caused by the power consumption/dissipation of the digital logic circuitry may alter the electrical signals produced by the pixels 206 while they are generated or after they are collected and before they are converted into digital data.

2. Example Power Signatures of an Image Sensor

Figure 3:
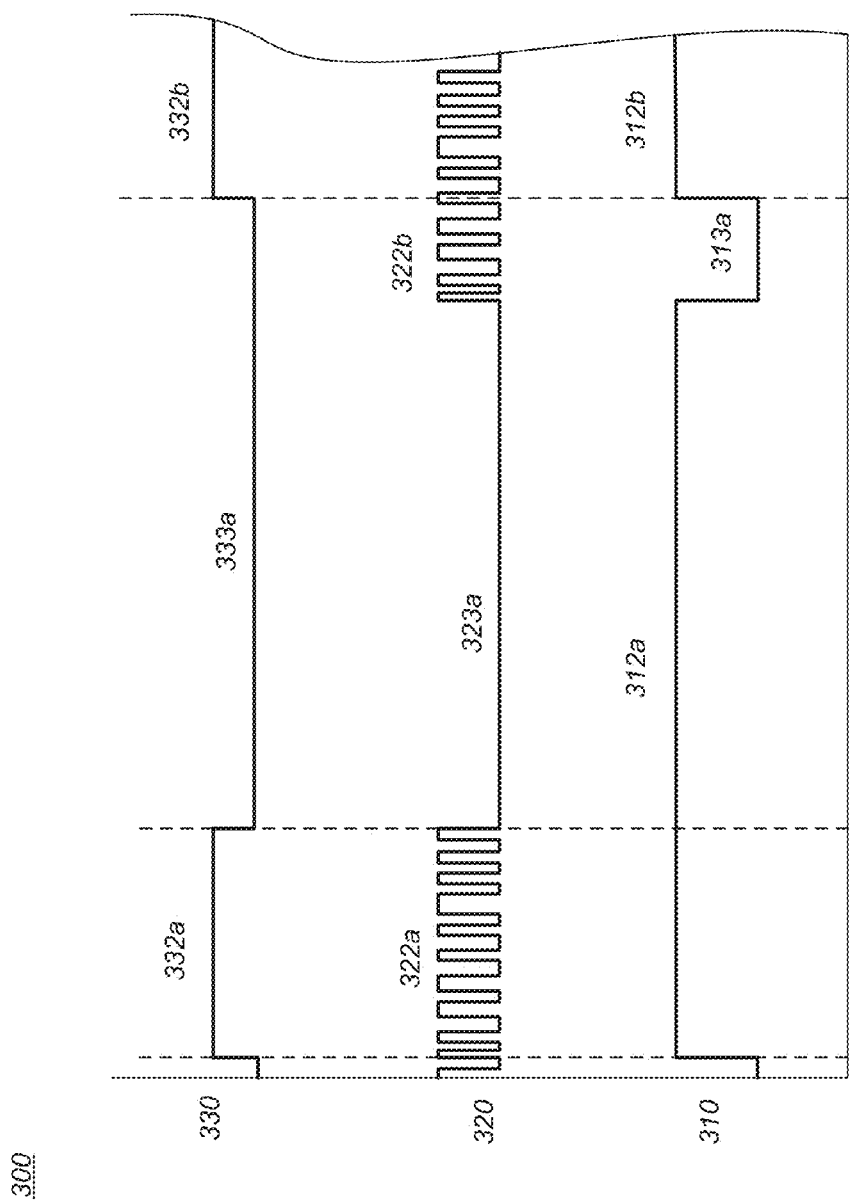
FIG. 3 depicts an example timing diagram for an example image sensor.

FIG. 3 depicts an example timing diagram of example operations of one embodiments of an image sensor. In particular, FIG. 3 depicts a timing diagram 300 of an example operational cycle 310 of example analog sensing circuitry. As described above with respect to FIG. 2, the analog sensing circuitry may include an array of photodetector pixels for converting light into electrical signals. The analog sensing circuitry also includes one or more row (or column) scanners for reading the electrical signals of a row (or column) of pixels in the sensor. In the current example, the pixel signals are read one row at a time during a row scan.

As shown in FIG. 3, the analog sensing circuitry may be operated over a scan cycle 312a which corresponds to the time the row scanner reads the electrical signals (e.g., accumulated charge) in one row of pixels. FIG. 3 also depicts the beginning of a subsequent scan cycle 312b which represents the initiation of another row scan. In the current example, there is a short dormant or delay cycle 313a separating the two scan cycles 312a and 312b. In some cases, other, non-scanning operations are performed by the analog sensing circuitry during the dormant or delay cycle 313a. Additionally, in some cases, there is no dormant or delay cycle 313a between scan cycles 312a and 312b.

The timing diagram 300 also depicts an example operational cycle 320 of example digital logic circuitry. The operations of the digital logic circuitry may include, for example, analog to digital conversion of signals received from the analog sensing circuitry, data transmission operations, data caching operations, and other digital logic operations. In the example depicted in FIG. 3, the operation of the digital logic circuitry is concentrated over a processing cycle 322a. In some cases, processing cycle 322a may be treated as a substantially continuous event. However, as shown in FIG. 3, the processing cycle is actually a group of relatively short processing operations that may vary in number and duration. As shown in FIG. 3, a subsequent processing cycle 322b may be performed after a dormant cycle 322a. In some cases, the subsequent processing cycle 322b corresponds to the digital logic processing of electrical signals scanned in previous scan cycle 312a.

The processing cycle 320 depicted in FIG. 3 represents the operation of the digital logic circuitry in accordance an example power-saving or high-efficiency mode of operation. For example, the digital logic circuitry may be configured to process any signals as they are received and as quickly as possible to maximize processing efficiency. The digital logic circuitry may also be configured to power down and maximize the dormant cycle 323a when the processing has been completed. Thus, in some cases the digital logic operation depicted in FIG. 3 may minimize power and optimize overall processing resources.

However, the transition of the digital logic circuitry between the operation cycles 322a, 322b and the dormant cycle 323a may affect analog sensing circuit operations that are occurring in parallel. In particular, the digital operation cycles 322a and 322b may generate electrical noise that affects a corresponding portion of the scan cycles 312a, 312b. The interference between the digital and analog operations is represented by an example observed interference sequence 330. The interference sequence 330 represents the potential effect of digital logic cycles (322a, 322b) that occur at the same time as portions of the scan cycles (312a, 312b). In particular, interference regions 332a and 332b represent portions of the cycle where digital logic operations 322a, 322b may affect or interfere with parallel portions of the scan cycles 312a, 312b. Non-interference region 333a represents a portion of the cycle where there is little or no electrical interference between the digital logic operations 322a, 322b and the analog sensing operations 312a, 312b.

In some cases, the abrupt transition between the interference regions 332a, 332b and the non-interference region 333a may result in undesirable visual artifacts in the digital image. For example, the interference caused by the digital logic operations may result in the pixel values read during that time as being slightly darker or lighter as compared to other pixel values that are read while there is little or no interference. This may result in a visible shadow or shaded line artifact in the final digital image. In some cases, the interference may result in bending artifacts or other visual inconsistencies in the digital image. In general, these types of artifacts reduce the overall quality of the digital image and are usually undesirable. Furthermore, these types of artifacts may be difficult to remove using post-processing techniques. In particular, the subtle changes in brightness or color that are visible to the human eye may be too fine or too unpredictable for traditional image processing to identify and correct.

Thus, in at least some cases, it may be advantageous to reduce or eliminate abrupt transitions between interfering and non-interfering regions in the operation cycle of the image sensor. In one example, the image sensor may be operated in a uniform power mode in which the operations of the digital logic circuitry occur over the same time interval as the analog sensing operations. Examples of operating an image sensor in a uniform power mode are provided below in Sections 2.a-c. and with respect to FIG. 6 a. Reducing Processing Rate to Produce a Uniform Power Signature

Figure 4:
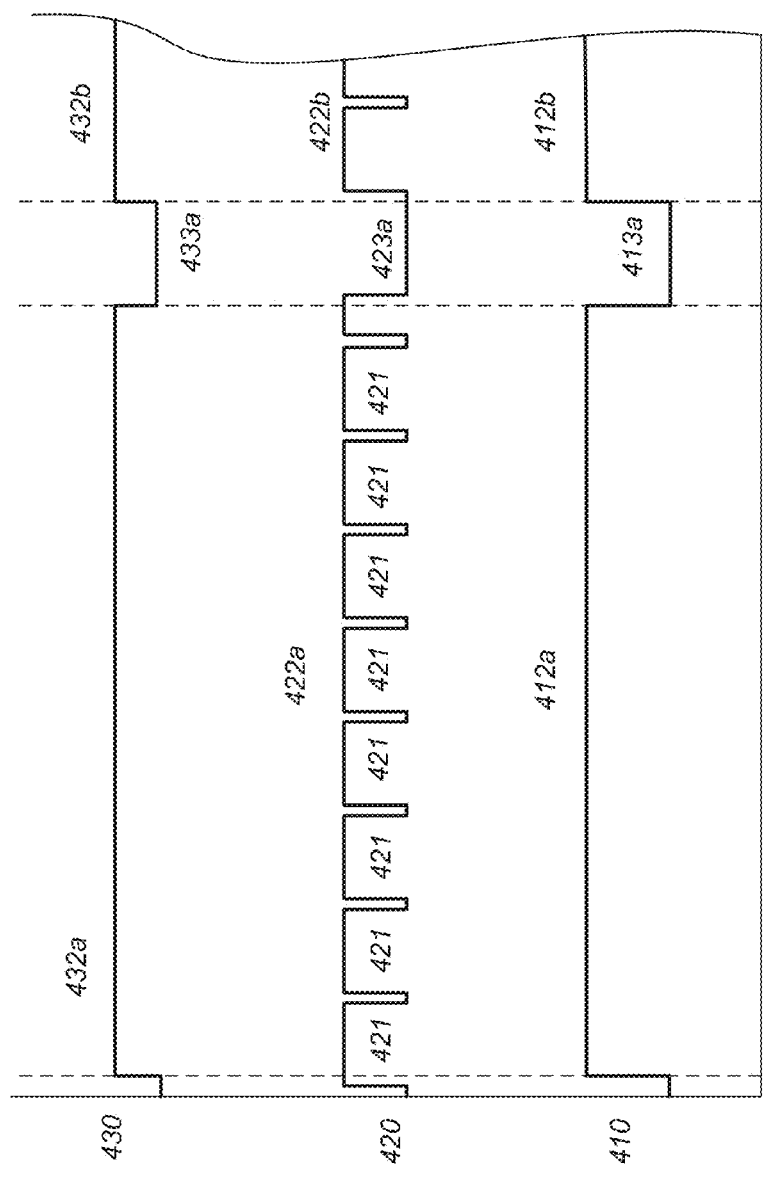
FIG. 4 depicts an example timing diagram for an example image sensor operating in a uniform power mode.

FIG. 4 depicts an example timing diagram for an image sensor operating in a uniform power mode. In particular, FIG. 4 depicts a timing diagram 400 including digital logic operations 420 that are configured to substantially coincide with analog sensor operations 410. That is, the digital logic processing cycles 422a, 422b are configured be performed over a time interval that is substantially the same as the time intervals of a scan cycles 412a, 412b being performed in parallel in the analog sensing circuitry.

In this example, the digital logic is operated at reduced processing rate to extend the duration of the digital logic operations. The individual operations 421 that comprise the digital logic processing cycle 422a, as shown in FIG. 4, may be performed at a lower processing rate in order to extend duration the duration of the digital logic processing cycle 422a. In particular, the individual operations 421 may be performed at a processing rate that is lower than the maximum processing rate of the digital logic circuitry. In some cases, the gaps or dormant periods between individual operations 421 is also minimized or reduced to minimize the amount of time that the digital logic circuitry is not being operated.

As a result of the reduced processing rate, the digital logic processing cycles 422a and 422b may substantially coincide with scan cycles 412a and 412b of the analog sensor operations 410. Thus, in this case, the digital logic processing cycle 422a may be characterized as having a substantially uniform power signature. More specifically, the digital logic operations 420 in this example are substantially uniform at least for the period of time that those operations substantially overlap with a corresponding scan cycle (412a, 412b).

By way of example, FIG. 4 depicts an observed interference sequence 430 that represents the potential effect of digital logic cycles 422a, 422b that occur at the same time as portions of the scan cycles 412a, 412b. In particular, interference regions 432a and 432b represent portions of the cycle where digital logic cycles 422a, 422b may effect or interfere with parallel scan cycles 412a, 412b. As shown in FIG. 4, the interference regions 432a and 432b coincide with the scan cycles 412a and 412b. Thus, while the digital logic circuitry may electrically interfere with the analog scan cycles 412a and 412b, the interference is substantially uniform throughout the scans. Also, there are no abrupt transitions between the interference regions 432a, 432b and the non-interference region 433a during a scan cycle 412a, 412b. Accordingly, the amount of visible artifacts or visual inconsistencies in the digital image may be reduced or eliminated.

In this example, it is not necessary that the digital logic and analog sensing operations overlap completely or that the digital logic operations are exactly continuous. As shown in FIG. 4, while there may be small gaps or delays between individual operations 421, there are no substantial delays or dormant cycles that overlap with the scan cycle 412a. (Note that, while the digital logic operations 420 may include a dormant cycle 423a, as shown in FIG. 4 the dormant cycle 423a does not substantially overlap with either of the scan cycles 412a and 412b.) Relatively small delays or a slight skew between the digital logic operations and the scan cycles may have a minimal effect because, in part, the electrical signals (e.g., pixel charge) may be accumulated over a time period that is greater than the gaps in the digital logic operations. Accordingly, relatively minor variations in the digital logic operations may be integrated into the accumulated sensor operations and have a minimal, or at least consistent, impact on the sensor output. In some cases, a delay period between two individual digital logic operations is less than a duration of either of the individual digital logic operations. In some cases, a delay period between two individual digital logic operations is less than 10% of the duration of either of the individual digital logic operations. In some cases, the delay period is less than 5% of the duration of the digital logic operations.

b. Adding Spacer Operations to Produce a Uniform Power Signature

In addition to the implementation described above with respect to FIG. 4, there are alternative techniques for reducing variations in the power signature of an image sensor. In particular, the data being processed by the digital logic circuitry may be metered out over a longer period of time to extend a digital logic processing cycle. In some cases, the digital logic processing cycle coincides with a complete scan cycle performed in parallel by the analog sensing circuitry. In one example, digital data downstream from the analog-to-digital converter (ADC) may be processed through a data pipeline in a metered fashion to extend the digital logic processing. In some case, additional processing operations (e.g., spacer operations) can be combined with necessary or valid processing operations to create a more uniform power signature.

Figure 5:
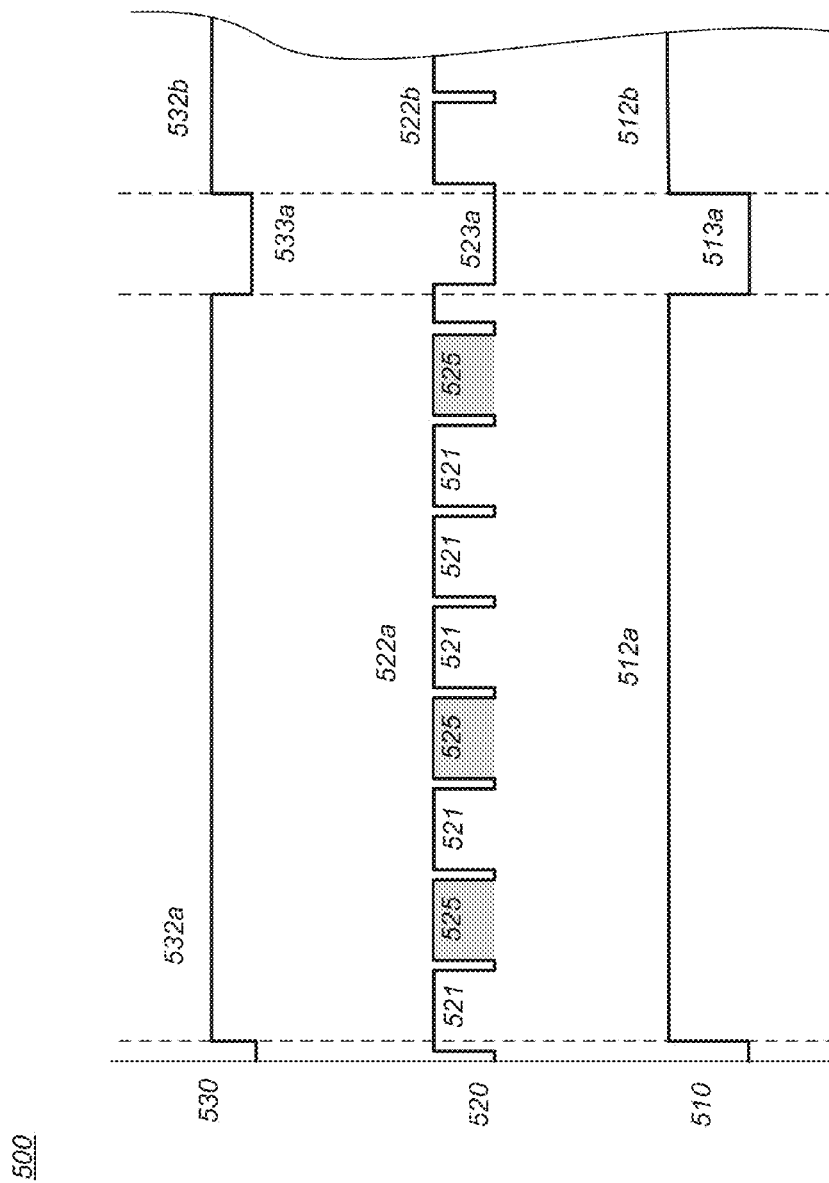
FIG. 5 depicts another example timing diagram for an image sensor operating in a uniform power mode.

In accordance with this approach, FIG. 5 depicts another example timing diagram for an image sensor operating in a uniform power mode. In particular, FIG. 5 depicts a timing diagram 500 including digital logic operations 520 that are configured to substantially coincide with analog sensor operations 510. That is, the digital logic processing cycles 522a, 522b are configured be performed over a time interval that is substantially the same as the time intervals of scan cycles 512a, 512b being performed in parallel in the analog sensing circuitry.

In this example, additional operations are inserted into the digital logic processing cycles 522a and 522b to extend the duration of the digital logic operations. In this example, the digital logic cycle 522a includes two types of operations: valid operations 521 and spacer operations 525. In some cases, the valid operations 521 correspond to operations that are necessary to convert the analog sensor signals into digital data. Valid operations 521 include data processing operations, data transmission operations, or other digital logic operations associated with the processing of the analog sensor signals. On the other hand, spacer operations 525 are added to the digital logic cycle 522a for the purpose of extending the duration of the digital logic cycle 522a by filling gaps or delays between valid operations 521 and typically operate on simulated or not-valid data. The spacer operations 525 may also include data processing operations, data transmission operations, or other digital logic operations. However, unlike valid operations 521, because the spacer operations 525 operate on simulated or not-valid data, the spacer operations 525 may not necessarily be used to convert the analog sensor signals into digital data. In some cases, the simulated data was not obtained using the analog sensing circuitry and is not used to produce the digital image. In some cases, the spacer operations 525 may be omitted without affecting the digital logic performance of the image sensor. In some cases, the spacer operations 525 are distinguished from the valid operations 521 because they are performed on simulated or not-valid data that is designated using a "valid" bit or other digital identifier. In some cases, automated clock gating tools can be used to reduce the power used when processing simulated or not-valid data.

As shown in FIG. 5, the addition of spacer operations 525 may extend the digital logic cycle 522a to improve the output of the image sensor. In particular, as a result of the addition of spacer operations 525, the digital logic processing cycle 522a may substantially coincide with the scan cycle 512a of the analog sensor operations 510. In some cases, the gaps or dormant periods between the valid operations 521 and the spacer operations 525 are also minimized or reduced to minimize the amount of time that the digital logic circuitry is not being operated. Thus, in this case, the digital logic processing cycle 522a may be characterized as having a substantially uniform power signature. More specifically, the digital logic operations 520 in this example are substantially uniform at least for the period of time that the digital logic operations substantially overlap with a scan cycle (512a, 512b).

By way of example, FIG. 5 depicts an example observed interference sequence 530 that represents the potential effect of digital logic cycles 522a, 522b on the analog sensor operations 510. In particular, interference regions 532a and 532b represent portions of the cycle where digital logic cycle 522a, 522b may effect or interfere with parallel scan cycles 512a, 512b. As shown in FIG. 5, the interference regions 532a and 532b coincide with the scan cycles 512a and 512b. Thus, while the digital logic circuitry may electrically interfere with the analog scan cycles 512a and 512b, the interference is substantially uniform throughout the scans. Also, there are no abrupt transitions between the interference regions 532a, 532b and the non-interference region 533a during a scan cycle 512a, 512b. Accordingly, the amount of visible artifacts or visual inconsistencies in the digital image may be reduced or eliminated.

As with previous examples, it is not necessary that the digital logic and analog sensing operations overlap completely or that the digital logic operations are exactly continuous. As shown in FIG. 5, while there may be small gaps between valid operations 521 and spacer operations 525, there are no substantial delays or dormant cycles that overlap with the scan cycle 512a. As discussed previously, small gaps or a slight skew between the digital logic operations and the scan cycles may have a minimal effect because, in part, the electrical signals (e.g., pixel charge) may be accumulated over a time period that is greater than the gaps in the digital logic operations. As discussed with respect to previous examples, there may be one or more delay or dormant cycles 513a, 523a between adjacent scan cycles (512a, 512b) or digital logic cycles (522a, 522b).

c. Forcing Data Variation to Produce a Uniform Power Signature

In general, the techniques described above with respect to FIGS. 4 and 5 may be effective because power consumption of the digital logic circuitry is at least partially data dependent. That is, the existence data signals alone may produce electrical noise or interference due to minor fluctuations in power consumption. In particular, as data bit values switch from low to high, some amount of power is consumed. Similarly, as data is switched from high to low, some amount of electrical power is dissipated. On the aggregate, the electrical noise generated by variations in the data signals may contribute to the uniformity of the power signature.

However, during the normal operation of an image sensor, some data values may tend to remain constant and cause minor fluctuations in the power consumption of the image sensor. Because the minor power fluctuations may affect the analog sensor operations, as discussed above, it may be advantageous to reduce the occurrence of static data values.

In one example, one or more pixels in the sensor array may become saturated because the amount of light incident on the pixel has exceeded the detection threshold of the photodetector. In this case, the digital data associated with any pixels that are saturated remains a constant, maximum value. In some cases, the digital data associated with the saturated pixels, on the aggregate, is static enough to reduce the power consumption of the digital logic circuitry.

In some cases, the digital data associated with saturated pixels (saturated data) is intentionally varied a small amount to force a change in bit values. For example, the a small value may be periodically added or subtracted from the saturated data to force the static value to change. In another example, the saturated data may be multiplied by a factor that results in a small change in the data value. In some cases, these small variations are sufficient to increase the power consumption of the digital image and improve the power signature uniformity. In some cases, the small variations are also small enough to not affect the visual appearance of a resulting digital image. That is, the data variations may be large enough to be effective in reducing fluctuations in the power consumption, yet small enough to remain visibly imperceptible to a human eye.

Additionally, the small variations induced in the static data may be removed by downstream processing before the digital image is created. For example, variations may be induced in the saturated data by slightly increasing the saturated data value. This may force bit values to change during the digital logic processing and produce the desired increase in power consumption. The artificially increased data values can then be truncated back to the original saturation data value just before output. As a result, the digital image will remain unaffected by the induced variation.

3. Example Process for Operating an Image Sensor

In accordance with the examples provided above, an image sensor may be configured to produce a uniform power signature. In particular, the examples discussed above with respect to Sections 2.a-c. may be implemented separately or in combination to improve the uniformity of the power signature produced by digital logic circuitry of an image sensor.

Figure 6:
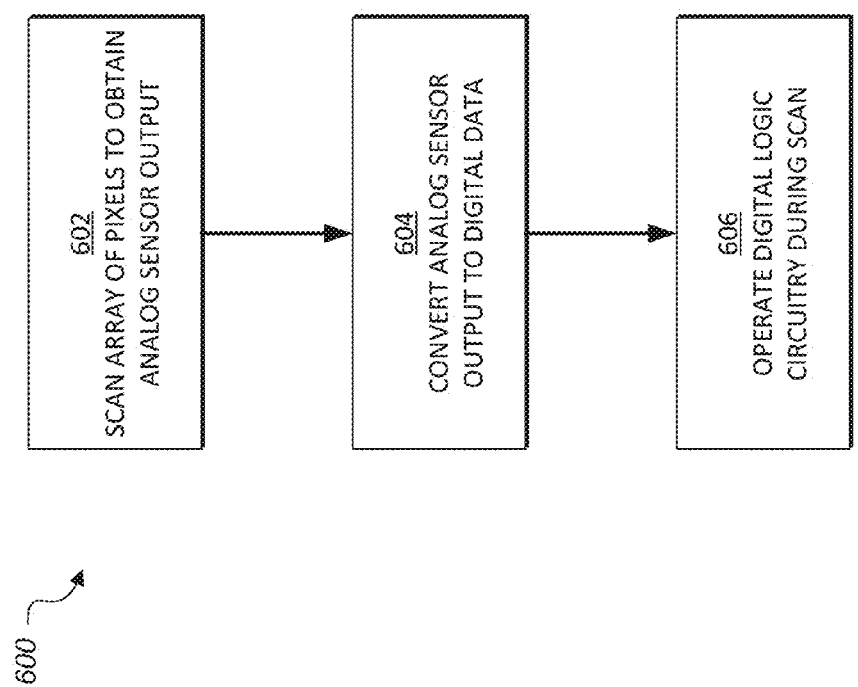
FIG. 6 depicts a flow chart of an example process for operating an image sensor.

FIG. 6 depicts a flow chart of an example process for operating an image sensor. In particular, FIG. 6 depicts an example process 600 for operating an image sensor in a uniform power mode. The following example is provided for a CMOS image sensor having at least one row of pixels. In particular, reference is made to the CMOS sensor 200 depicted in FIG. 2. However, process 600 can also be applied to other sensor configurations and other sensor types, including a charge-coupled device (CCD) sensor array or other type of active-pixel sensor.

In operation 602, an array of pixels is scanned to obtain an analog sensor output. In particular, an array of photodetector pixels may be scanned using analog sensing circuitry, including, for example, a row scanner 212 or column scanner 208, as described above with respect to FIG. 2. In one example implementation, the analog sensing circuitry of the image sensor operates on a regular scan cycle to collect electrical signals accumulated by the pixels. With regard to a CMOS-type image sensor, the analog sensing circuitry may operate on a row-scan cycle where each row of pixels is scanned sequentially. During each scan cycle, the charge that has been accumulated on each pixel in the row (signal value) is read and then the pixel is reset to begin charge accumulation for the next cycle.

In accordance with the examples provided above, the row (or column) scan may be performed over a specified time interval. The duration of the time interval may depend, at least in part, on the number of pixels being scanned, the duration of any accumulation time used to collect sensor information, and the number of samples or readings performed for each pixel in the array.

In operation 604, the analog sensor output is converted to digital data. In particular, the analog sensor output of operation 602 is converted in using the digital logic circuitry. In one example, the analog sensor output is converted to digital data using analog-to-digital converter (ADC) circuitry. In some cases, the analog sensor output is converted into a set of digital data values. In some cases, the digital data values are further processed using additional digital logic circuitry. The digital data may be used to produce a digital image that may be stored in computer-readable memory or displayed on a display device.

In one example implementation, the analog sensor output is processed during a digital logic operation cycle that is subsequent to the digital logic operations performed in operation 606, below. In some cases, the conversion of the analog sensor output is also performed in accordance with the techniques for providing a substantially uniform power signature discussed below with respect to operation 606.

In operation 606, the digital logic circuitry is operated during the pixel scan of operation 602. In particular, the digital logic circuitry is operated over the time interval of the scanning operation 602 such that the operation of the digital logic circuitry substantially coincides with the scanning of the array of pixels. Operation 606 may be performed in accordance with any of the examples provided above with respect to Sections 2.a-c.

In one example, the processing rate may be set to extend the digital logic processing to coincide with the pixel scan operations. In one example, the processing rate is reduced resulting in an overall digital logic processing time that is substantially the same as, and occurs in parallel with, the time interval of the pixel scan. In some cases, the processing rate is extended to provide a substantially uniform power signature during the scan performed in operation 602. In some cases, the time interval of the scan operation is measured or obtained and the approximate number of digital logic operations are estimated. The processing rate may then be determined based on the ratio or the relative difference between the time interval of the scan and the estimated number of digital logic operations to be performed. Section 2.a., above provides an example of an image sensor operated in accordance with this technique.

In another example, additional spacer operations are inserted into a sequence of valid digital logic operations. In some cases, the valid digital logic operations are metered out such that they are performed over the entire duration of the scanning operation in 602. Spacer operations may be interspersed with the valid logic operations to provide a substantially uniform power signature during the scan performed in operation 602. In some cases, the processing rate of the operations is also adjusted in combination with the use of spacer operations to achieve a substantially uniform power signature. Section 2.b., above provides an example of an image sensor operated in accordance with this technique.

In yet another example, static data may be artificially varied to improve the power signature of the digital logic circuitry. In one example, the data associated with saturated pixels may be varied a small amount to increase the power consumption or power dissipation of the digital logic circuitry. Section 2.c., above provides an example of an image sensor operated in accordance with this technique.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method of operating an image sensor in a uniform power mode, the method comprising:

scanning an array of pixels using analog sensing circuitry to obtain an analog sensor output, wherein the scanning is performed over a first time interval;

converting the analog sensor output to a digital data output using digital logic circuitry, wherein the converting occurs over a second time interval that is subsequent to the first time interval; and while the array of pixels are being scanned, operating the digital logic circuitry over the first time interval and substantially coinciding with the scanning of the array of pixels to produce a uniform power signature by the digital logic circuitry throughout the first time interval.

2. The method of claim 1, wherein operating the digital logic circuit comprises:

setting a processing rate of the digital logic circuitry to cause the operating of the digital logic circuitry to occur throughout the first time interval;

performing two or more individual digital logic operations at the set processing rate.

3. The method of claim 2, wherein the two or more individual digital logic operations are performed on data obtained from a previous pixel scanning operation.

4. The method of claim 2, wherein the two or more individual digital logic operations are separated by a delay period that is less than a duration of either of the two or more individual digital logic operations.

5. The method of claim 4, wherein the delay period is less than 10% of the duration of either of the two or more individual digital logic operations.

6. The method of claim 1, wherein operating the digital logic circuitry comprises:

performing one or more valid digital logic operations on data obtained from a previous scan using the analog sensing circuitry;

performing one or more spacer digital logic operations on simulated data that was not obtained using the analog sensing circuitry.

7. The method of claim 6, wherein the one or more valid digital logic operations in combination with the one or more spacer digital logic operations cause the operating of the digital logic circuitry to occur throughout the first time interval.

8. The method of claim 6, wherein the data obtained from a previous scan using the analog sensing circuitry is identified using a valid data bit.

9. The method of claim 1, further comprising:

converting the analog sensor output into a set of digital data values;

identifying a static digital data value within the set of digital data values; and varying the static digital data to force a change in bit values of the static digital data.

10. The method of claim 9, wherein the analog sensor output includes an output from at least one pixel that is saturated.

11. The method of claim 9, wherein the varying the static digital data includes one or more of:

adding a value to the static digital data;

subtracting a value from the static digital data; and multiplying the static digital data by a factor.

12. The method of claim 9, further comprising:

truncating the static digital data before creating a digital image using the static digital data.

13. The method of claim 1, wherein the second time interval is substantially the same duration as the first time interval.

14. The method of claim 1, wherein the operating the digital logic circuitry results in a substantially uniform power signature.

15. The method of claim 1, further comprising:

producing a digital image using the digital data output, and storing the digital image in computer-readable memory.

16. The method of claim 1, further comprising:

scanning a second array of pixels using the analog sensing circuitry to obtain a second analog sensor output, wherein the scanning is performed over the second time interval.

17. A portable electronic device for producing a digital image, the portable electronic device including a digital camera having an image sensor, wherein the image sensor includes analog sensing circuitry and digital logic circuitry and wherein the image sensor is configured to:

scan an array of pixels using the analog sensing circuitry to obtain an analog sensor output, wherein the scan is performed over a first time interval;

convert the analog sensor output to a digital data output using the digital logic circuitry, wherein the conversion occurs over a second time interval that is subsequent to the first time interval; and operate digital logic circuitry over the first time interval and substantially coinciding with the scan of the array of pixels to produce a uniform power signature by the digital logic circuitry throughout the first time interval.

18. The portable electronic device of claim 17, wherein the image sensor is a CMOS image sensor.

19. The portable electronic device of claim 17, wherein the analog sensing circuitry includes a row scanner for reading values from the array of pixels.

20. The portable electronic device of claim 17, wherein the image sensor comprises one of:

a two-dimensional array of photodetector pixels; and a one-dimensional array of photodetector pixels.

* * * * *